US007028701B1

(12) United States Patent
Law et al.

(10) Patent No.: US 7,028,701 B1
(45) Date of Patent: Apr. 18, 2006

(54) PARTICLE BUILD-UP PREVENTION IN FLOWING SYSTEMS

(75) Inventors: Robert James Law, Livermore, CA (US); David Phillip Siegwarth, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/176,228

(22) Filed: Jul. 8, 2005

Related U.S. Application Data

(62) Division of application No. 10/364,531, filed on Feb. 12, 2003, now Pat. No. 6,945,268.

(51) Int. Cl.
*F16K 51/00* (2006.01)

(52) U.S. Cl. .................................... 137/15.07; 137/242

(58) Field of Classification Search ............ 137/15.07, 137/242; 251/77

See application file for complete search history.

(56) References Cited

U.S. PATENT DOCUMENTS

| | | | | |
|---|---|---|---|---|
| 2,986,099 A | | 5/1961 | Guptill, Jr. | |
| 4,003,393 A | * | 1/1977 | Jaggard et al. | 137/15.07 |
| 4,015,914 A | | 4/1977 | Kushner et al. | |
| 4,314,577 A | * | 2/1982 | Brister | 137/15.07 |
| 4,391,289 A | * | 7/1983 | Adams | 137/15.07 |
| 5,208,165 A | | 5/1993 | Law et al. | |
| 5,285,486 A | | 2/1994 | Cowan, II et al. | |
| 5,287,392 A | | 2/1994 | Cowan, II et al. | |
| 5,625,656 A | | 4/1997 | Hettiarachchi et al. | |
| 5,719,911 A | | 2/1998 | Hettiarachchi et al. | |
| 5,918,272 A | | 6/1999 | Snyder et al. | |

* cited by examiner

*Primary Examiner*—Kevin Lee
(74) *Attorney, Agent, or Firm*—Nixon & Vanderhye P.C.

(57) ABSTRACT

A system serves to prevent or remove particle build-up in flowing systems, wherein a fluid flows in a conduit to a valve body. A mechanical shock is periodically generated in the valve body that is of a sufficient magnitude to disturb any particle attachment in the conduit or the valve body. The shock may be generated via direct impact with the valve body or passively using the fluid flowing in the conduit.

9 Claims, 2 Drawing Sheets

PARTICLE BUILD-UP PREVENTION IN FLOWING SYSTEMS

CROSS-REFERENCES TO RELATED APPLICATIONS

This application is a divisional of U.S. patent application Ser. No. 10/364,531, filed Feb. 12, 2003, now U.S. Pat. No. 6,945,268, the entire content of which is hereby incorporated by reference in this application

BACKGROUND OF THE INVENTION

The present invention relates to flowing systems and, more particularly, to a system and method for preventing particle build-up in flowing systems.

Particles can build up in flowing systems and reduced dimensions that may be critical to flow control, flow measurement or pressure control. For example, in a boiling water nuclear reactor, maintaining flow control and pressure reduction in sample lines with valves and orifices is a problem. These small lines are required to deliver constant unattended flow at high temperatures for measurements of electrochemical corrosion potential (ECP) or material monitoring devices or at reduced temperatures and pressures to monitoring elements such as conductivity, pH, ECP, chemistry monitoring equipment, filter samples, etc.

Particle build-up inside the valve throat changes the orifice dimensions and thus alters the flow of pressure control function. Valve clogging can force the flows to be out of specification within hours or days depending on the particle concentrations and need for flow precision. Build-up on flow elements can yield errors.

Upstream filtering in boiling water nuclear reactors can become large radiation sources, influence the desired measurements and is generally not practical in most cases. Attending the control valve to maintain flows and pressure is costly or impractical except for short periods where grab sampling is all that is desired. Complex feedback control is another method that will compensate for valve orifice changes but is costly and a high maintenance concern.

It would thus be desirable to prevent particle build-up on surfaces, which will allow the component to maintain its function.

BRIEF DESCRIPTION OF THE INVENTION

In an exemplary embodiment of the invention, a method of preventing particle build-up in flowing systems where a fluid flows in a conduit to a valve body is provided. The method includes periodically generating a mechanical shock in the valve body, which shock is of a sufficient magnitude to disturb any particle attachment in the conduit or the valve body.

In another exemplary embodiment of the invention, an apparatus for preventing particle build-up in flowing systems, wherein a fluid flows in a conduit to a valve body, includes a shock mechanism coupled with the valve body that periodically generates a mechanical shock in the valve body. The mechanical shock is of a sufficient magnitude to disturb any particle attachment in the conduit or the valve body.

In still another exemplary embodiment of the invention, the step of generating a mechanical shock in the valve body is practiced by one of directly acting on the valve body via direct contact with the valve body or indirectly acting on the valve body via contact with the valve body through the conduit.

DETAILED DESCRIPTION OF THE INVENTION

Figure 1:
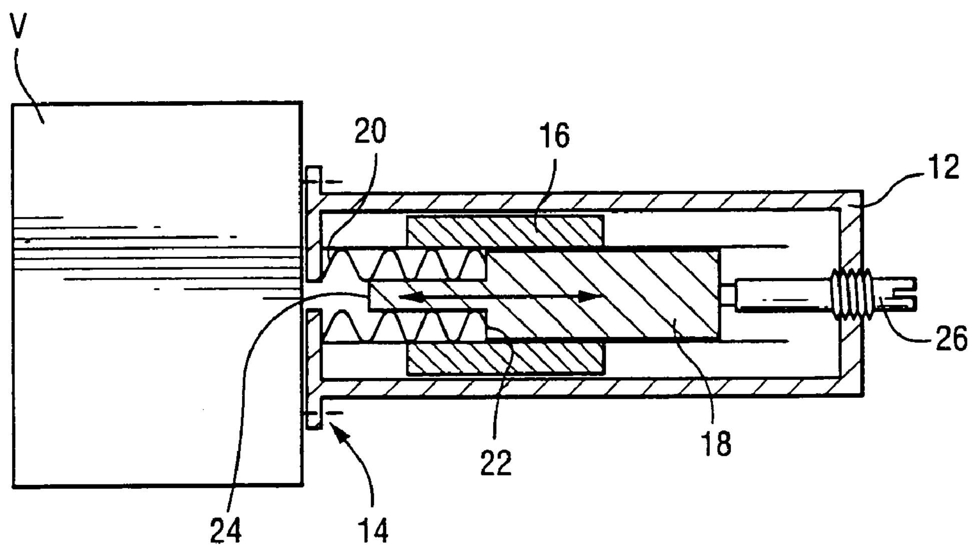
FIG. 1 shows a schematic illustration of one embodiment where an electromagnetic actuator drives a plunger into the valve body.
Figure 2:
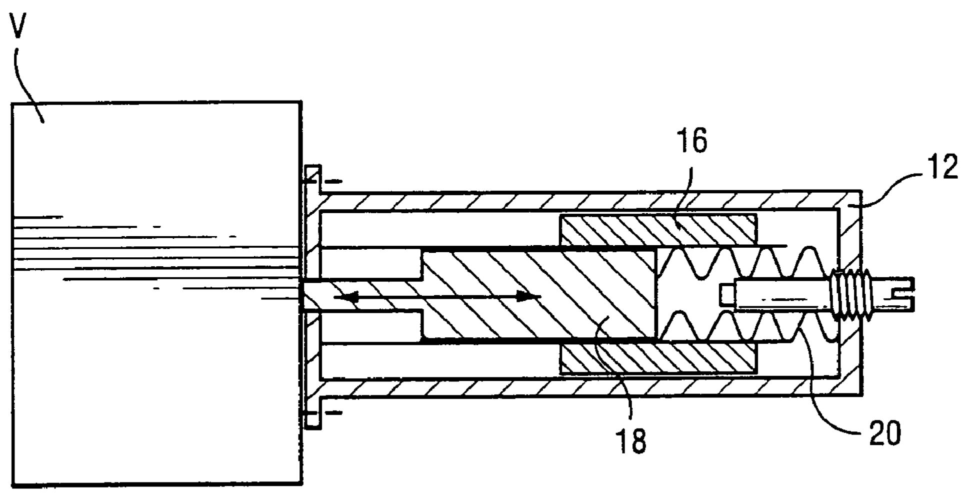
FIG. 2 shows an embodiment where a spring drives the plunger into the valve body.

Generally, the system and method of the invention create a mechanical agitation or shock that will prevent particle attachment to the orifice surface of a valve body or knock it off periodically. FIGS. 1 and 2 illustrate systems that effect direct contact with a valve body to generate a mechanical shock in the valve body. A plunger housing 12 is secured directly to the valve body V via an attachment device 14 such as a screw or the like. An electromagnetic actuator 16 is disposed in the plunger housing 12 and coupled with a power source, either AC or DC. An iron plunger 18 is mounted in the plunger housing and is surrounded by the electromagnetic actuator 16.

A shoulder 22 is formed in the iron plunger 18 at an interim portion thereof, leading to an impact end as shown at 24. The shoulder 22 defines a shelf for supporting a spring 20 between the plunger and the plunger housing 12 as shown in FIG. 1.

In operation, the electromagnetic actuator 16 or electrical coil thereof forces the iron plunger 18 forward so that the impact end 24 of the plunger 18 strikes the valve body V. A stroke of the plunger 18 can be adjusted via a stroke adjusting mechanism 26. The electrical current in the coil and the stroke adjusting mechanism 26 control the agitation or shock on the valve body V. The frequency of shocks can be adjusted using a known timing circuit according to user preference.

FIG. 2 shows an alternative embodiment of the direct contact system, wherein the electromagnetic actuator 16 is activated to retract the plunger 18 from the valve body V, where the spring 20 is mounted between the plunger 18 and an opposite side of the plunger housing 12. In this manner, when the electromagnetic actuator 16 is de-energized, the spring 20 drives the iron plunger 18 into the valve body V.

The actions described with reference to FIGS. 1 and 2 generally utilize stored spring forces generated by a magnetic field. Gravity could also be utilized to create the shock by an object falling or swinging from a pivot.

Those of ordinary skill in the art may appreciate alternative systems for effecting direct contact with the valve body V to generate a mechanical shock. For example, an ultrasonic transmitter may be attached to the valve body, wherein frequency and amplitude can be electronically controlled. Additionally, a timer can be included to fire the transmitter at periodic intervals. Other external vibrating devices could also be utilized. For example, external electromagnetic coils can cause vibrations when associated with incorrect field conductors. Although these devices tend to heat up, the devices could have long lifetimes if only used periodically.

Other strikers such as doorbell chimes or ringers are also suitable. Additionally, the opening in the attachment device 14 may be eliminated, with the plunger 18 striking the attachment device 14 to transmit the shock wave to the valve body V, thus preventing valve body material damage.

Figure 3:
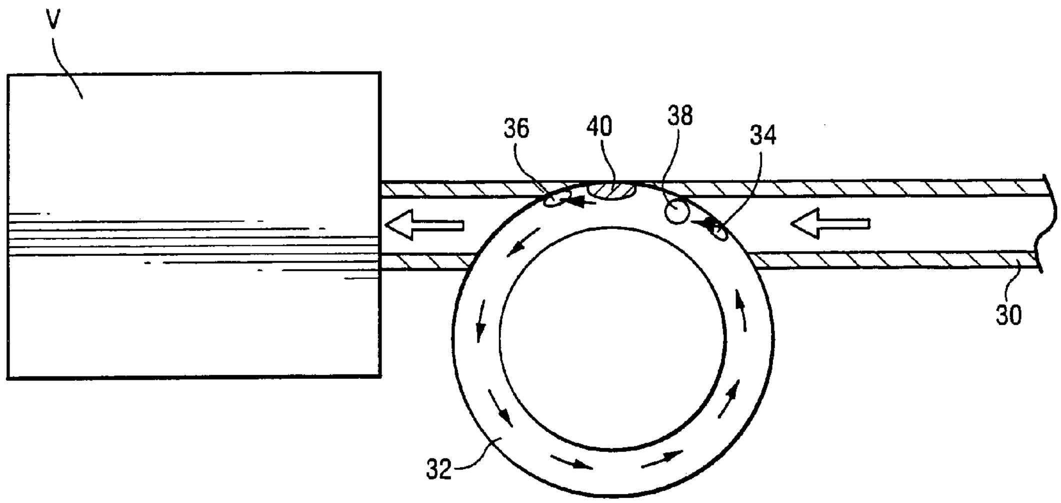
FIG. 3 shows a passive system using the main flow in the conduit to generate a shock.

With reference to FIG. 3, an embodiment incorporating a passive system for generating a mechanical shock in the valve body is shown. In the passive system, fluid flowing in the main conduit 30 is used to generate the mechanical shock. In FIG. 3, a diversion section 32 such as a loop flow tube or the like incorporates an inlet 34 in the upstream path of the conduit 30 and an outlet 36 downstream in the conduit 30. A shock member 38 such as a sphere or like element is driven in the diversion section 32 by the force of the fluid flowing in the conduit 30 and the diversion section 32. One or more deflection bumps 40 are positioned in the diversion section 32 such that as the shock member 38 is driven over each of the deflection bumps 40, a mechanical shock is generated in the conduit 30, which is transferred to the valve body V via the connection between the conduit 30 and the valve body V.

The mechanical impacts and frequency can be controlled by design and penetrations into the diversion section 32, altering device speed and frequency. Bypass flow valves could be used to make the diversion section 32 externally adjustable.

In an alternative arrangement similar to the FIG. 3 embodiment, a non-spherical or oblong diversion section may be used. The alternatively-shaped arrangement may not necessarily incorporate the deflection bump. Rather, the shock member's natural inconsistent motion around the path may yield wall strikes that produce sufficient shock waves.

Figure 4:
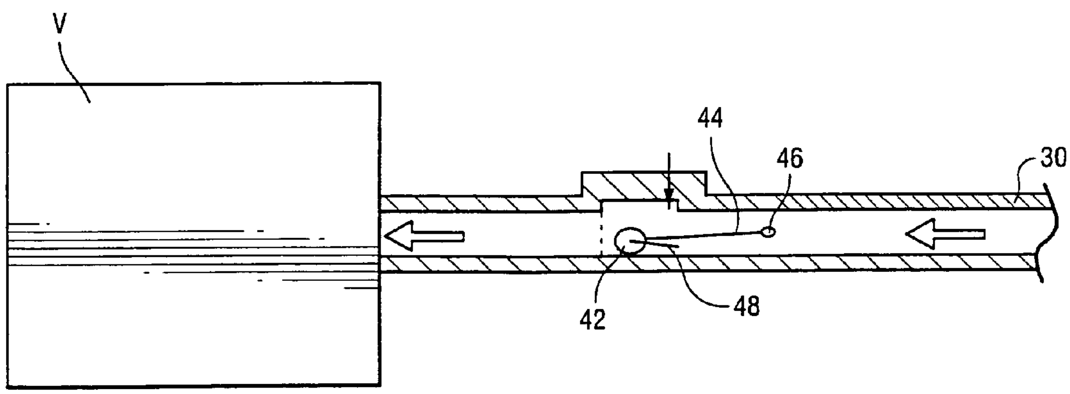
FIG. 4 shows an alternative embodiment passive system using a shock mechanism mounted in the conduit.

FIG. 4 illustrates an alternative passive system that also utilizes the fluid flow in the conduit 30. In this embodiment, the shock assembly is mounted within the conduit 30 upstream of the valve body V. The shock assembly shown in FIG. 4 includes a weight 42 secured to one end of a supporting member 44, which is pivotally supported at an opposite end in the conduit 30 at a pivot 46. A deflection member 48, shown schematically in FIG. 4, is associated with the weight 42, wherein fluid flowing within the conduit 30 drives the weight 42 back and forth into contact with interior surfaces of the conduit 30 via an interaction between the fluid flowing in the conduit 30 and the deflection member 48. In operation, as the weight 42 impacts one side of the conduit 30, the deflection member 48 is tripped to an angle that will redirect the weight 42 to the other side of the conduit 30 using the fluid flow impact on the deflection member 48. Both momentum and the position of the stop serve to control the flip-flop action of the weight 42 and impact velocity.

In any of the described embodiments, the shock wave frequency could be tuned or optimized for the natural frequency of the particles and built-up mass to impart the necessary energy to excite the particles or agglomeration. Moreover, the shock imparted could be continuous to prevent build up, effected over a prescribed time period, or controlled by a feedback signal when a flow limit specification is attained. Preferably, the impact materials should be fabricated to minimize damage and increase operational longevity.

With the arrangements of the present invention, particle build-up in flowing systems can be prevented or removed by periodically generating a mechanical shock. The mechanical shock can be generated either directly with a valve body or like component of concern or indirectly using a passive arrangement associated with the component.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of preventing particle build-up in flowing systems, wherein a fluid flows in a conduit to a valve body, the method comprising periodically generating a mechanical shock in the valve body, the mechanical shock being of a sufficient magnitude to disturb any particle or agglomeration of particles attachment in the conduit or the valve body, wherein the generating step is practiced using the fluid flowing in the conduit.

2. A method according to claim 1, wherein the generating step is practiced by diverting fluid from the conduit to a diversion section having a fluid outlet downstream in the conduit, the diversion section containing a shock member therein, wherein the generating step further comprising driving the shock member in the diversion section with the fluid diverted from the conduit.

3. A method according to claim 2, wherein the shock member is a spherical member, and wherein the diversion section includes a deflection bump therein, the generating step being practiced by cyclically driving the spherical member over the deflection bump.

4. A method according to claim 1, wherein a shock assembly is mounted in the conduit upstream of the valve body, the generating step being practiced by driving the shock assembly back and forth with the fluid flowing in the conduit.

5. A method according to claim 4, wherein the shock assembly comprises a weight secured to one end of a supporting member, an opposite end of the supporting member being pivotally secured to a pivot, wherein the weight is provided with a deflection member, the generating step being practiced by driving the weight back and forth into contact with interior surfaces of the conduit via an interaction between the fluid flowing in the conduit and the deflection member.

6. An apparatus for preventing particle build-up in flowing systems, wherein a fluid flows in a conduit to a valve body, the apparatus comprising a shock mechanism coupled with the valve body that periodically generates a mechanical shock in the valve body, the mechanical shock being of a sufficient magnitude to disturb any particle or agglomeration of particles attachment in the conduit or the valve body, wherein the shock mechanism comprises a diversion section in fluid communication with the conduit and having a fluid outlet downstream in the conduit, the diversion section containing a shock member therein, wherein fluid from the conduit is diverted to the diversion section upstream of the valve body, thereby driving the shock member in the diversion section.

7. An apparatus according to claim 6, wherein the shock member is a spherical member, and wherein the diversion section includes a deflection bump therein, the spherical member being cyclically driven over the deflection bump by the fluid from the conduit.

8. An apparatus for preventing particle build-up in flowing systems, wherein a fluid flows in a conduit to a valve body, the apparatus comprising a shock mechanism coupled with the valve body that periodically generates a mechanical shock in the valve body, the mechanical shock being of a sufficient magnitude to disturb any particle or agglomeration of particles attachment in the conduit or the valve body, wherein the shock mechanism comprises a shock assembly mounted in the conduit upstream of the valve body, the shock assembly being driven back and forth with the fluid flowing in the conduit.

9. An apparatus according to claim 8, wherein the shock assembly comprises a weight secured to one end of a supporting member, an opposite end of the supporting member being pivotally secured to a pivot, wherein the weight is provided with a deflection member, such that the weight is driven back and forth into contact with interior surfaces of the conduit via an interaction between the fluid flowing in the conduit and the deflection member.

* * * * *